(12) United States Patent
Lin et al.

(10) Patent No.: US 9,651,808 B2
(45) Date of Patent: May 16, 2017

(54) DISPLAY DEVICE

(71) Applicant: AOPEN INC., New Taipei (TW)

(72) Inventors: Te-An Lin, New Taipei (TW); Jing-Woei Teng, New Taipei (TW)

(73) Assignee: AOPEN INC., New Taipei (TW)

( * ) Notice: Subject to any disclaimer, the term of this patent is extended or adjusted under 35 U.S.C. 154(b) by 172 days.

(21) Appl. No.: 14/635,788

(22) Filed: Mar. 2, 2015

(65) Prior Publication Data
US 2016/0178955 A1    Jun. 23, 2016

(30) Foreign Application Priority Data

Dec. 19, 2014   (TW) .............................. 103222595 U

(51) Int. Cl.
*G02F 1/1333*    (2006.01)
*A47B 81/06*    (2006.01)

(52) U.S. Cl.
CPC ........ *G02F 1/133308* (2013.01); *A47B 81/06* (2013.01); *G02F 1/13336* (2013.01); *G02F 2001/133314* (2013.01); *G02F 2001/133325* (2013.01); *G02F 2001/133328* (2013.01); *G02F 2201/46* (2013.01)

(58) Field of Classification Search
None
See application file for complete search history.

(56) References Cited

U.S. PATENT DOCUMENTS

| | | | | |
|---|---|---|---|---|
| 8,125,787 B2* | 2/2012 | Chen | ..................... | G06F 1/1601 361/736 |
| 8,154,682 B2* | 4/2012 | Arihara | ................ | G02B 6/0055 349/58 |
| 2009/0310288 A1* | 12/2009 | Lee | .................... | G02F 1/133308 361/679.01 |
| 2010/0172154 A1* | 7/2010 | Takeuchi | .......... | G02F 1/133308 362/613 |
| 2011/0043721 A1* | 2/2011 | Hwang | ................ | G02B 6/0085 349/58 |
| 2011/0292315 A1* | 12/2011 | Bae | ...................... | G02B 6/0088 349/58 |

* cited by examiner

*Primary Examiner* — Ryan Crockett
(74) *Attorney, Agent, or Firm* — Maschoff Brennan

(57) ABSTRACT

A display device includes a display frame and a display module. The display frame includes multiple side frame pieces, multiple corner frame pieces and a back cover. Each side frame piece has a predetermined length. The multiple corner frame pieces are connected to the multiple side frame pieces, for forming an accommodating space surrounded by the multiple side frame pieces and the multiple corner frame pieces. The back cover is assembled with a side of the multiple side frame pieces and a side of the multiple corner frame pieces, and covers the accommodating space. The display module is disposed inside the accommodating space of the display frame.

19 Claims, 18 Drawing Sheets

DISPLAY DEVICE

CROSS-REFERENCE TO RELATED APPLICATIONS

This non-provisional application claims priority under 35 U.S.C. §119(a) on Patent Application No(s). 103222595 filed in Taiwan, R.O.C. on Dec. 19, 2014, the entire contents of which are hereby incorporated by reference.

BACKGROUND

Technical Field

The disclosure relates to a display device. More particularly, the disclosure relates to a display device with a modularized display frame.

Background

With the development of photovoltaic technology and semiconductor manufacturing technology, plane display devices have been widely used for users. In recent years, cathode ray tube (CRT) display devices are replaced by liquid crystal display (LCD) devices since the LCD devices are small in sizes and light in weights. Additionally, the LCD devices can be operated in low voltages without radiation scattering. Generally speaking, display components, such as display panel and backlight modules, are enclosed by front frames and rear frames of the LCD devices.

SUMMARY

One aspect of the disclosure provides a display device which includes a display frame and a display module. The display frame includes a plurality of side frame pieces, a plurality of corner frame pieces and a back cover. Each side frame piece has a predetermined length. The plurality of corner frame pieces are connected to the plurality of side frame pieces, for forming an accommodating space surrounded by the plurality of side frame pieces and the plurality of corner frame pieces. The back cover is assembled with a side of the plurality of side frame pieces and a side of the plurality of corner frame pieces, and covers the accommodating space. The display module is disposed inside the accommodating space of the display frame.

Another aspect of the disclosure provides a display frame which includes a plurality of side frame pieces, a plurality of corner frame pieces and a back cover. Each side frame piece has a predetermined length. The plurality of corner frame pieces are connected to the plurality of side frame pieces, for forming an accommodating space surrounded by the plurality of side frame pieces and the plurality of corner frame pieces. The back cover is assembled with a side of the plurality of side frame pieces and a side of the plurality of corner frame pieces, and covers the accommodating space.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1A:
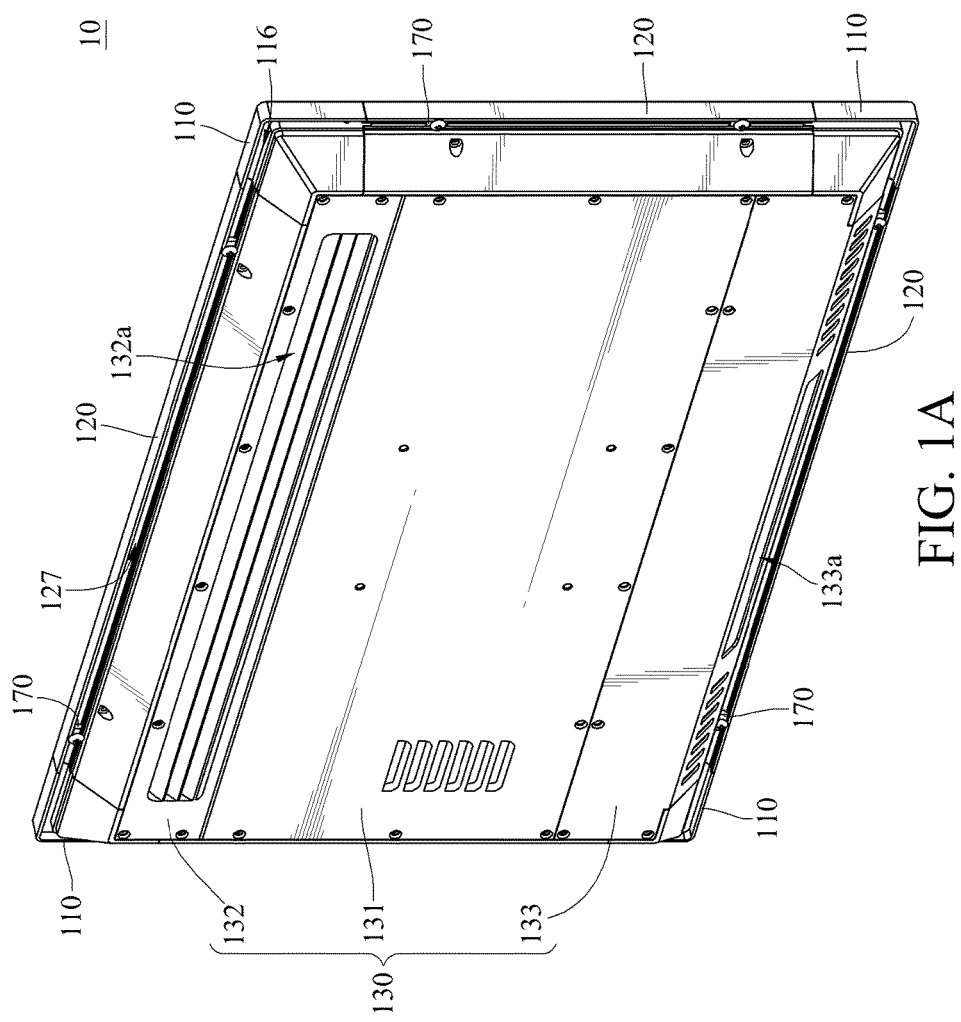
FIG. 1A is a rear perspective view of a display device according to a first embodiment of the disclosure.
Figure 1B:
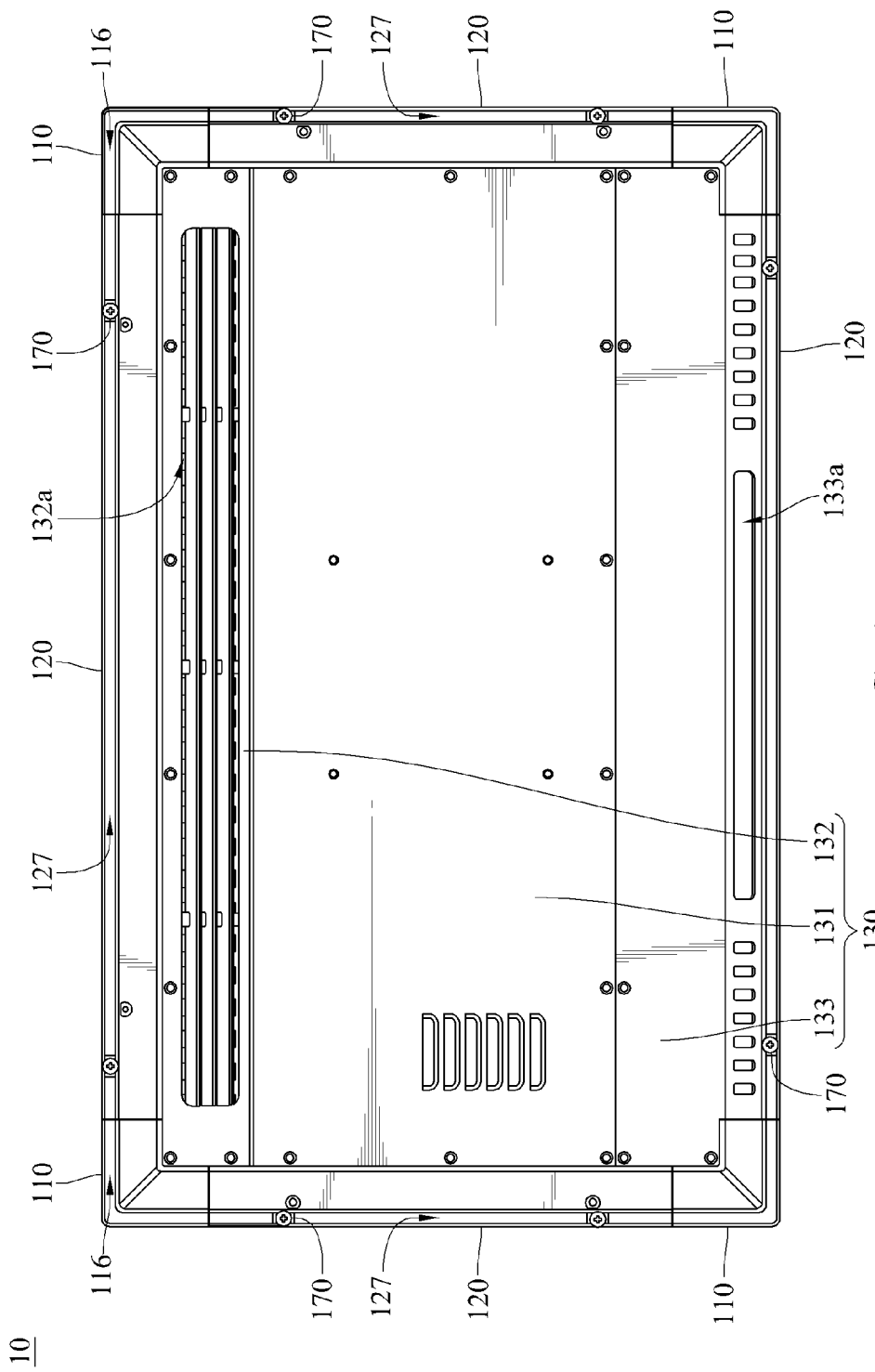
FIG. 1B is a rear view of the display device in FIG. 1A.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
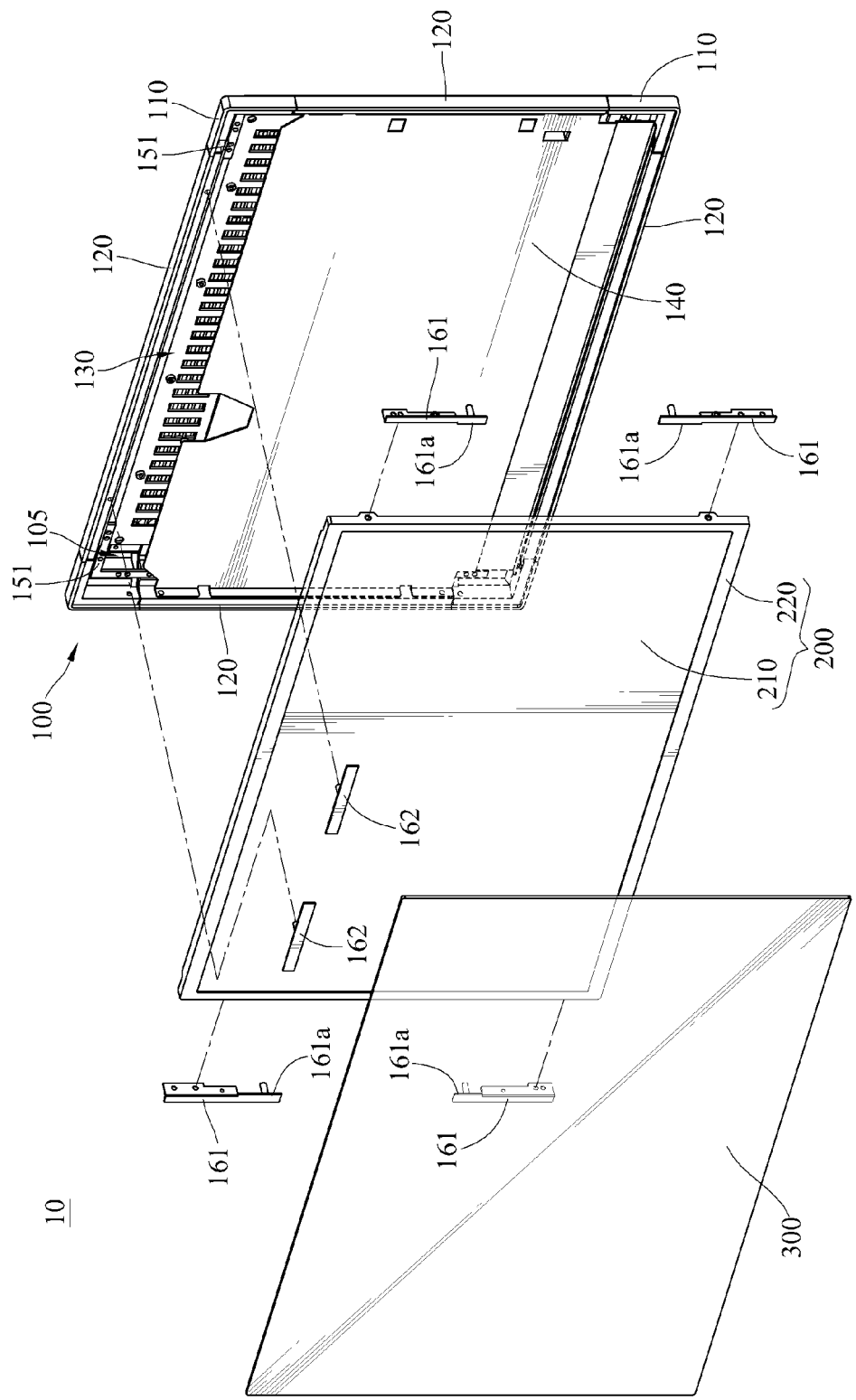
FIG. 2 is a partially exploded view of the display device in FIG. 1A.
Figure 3:
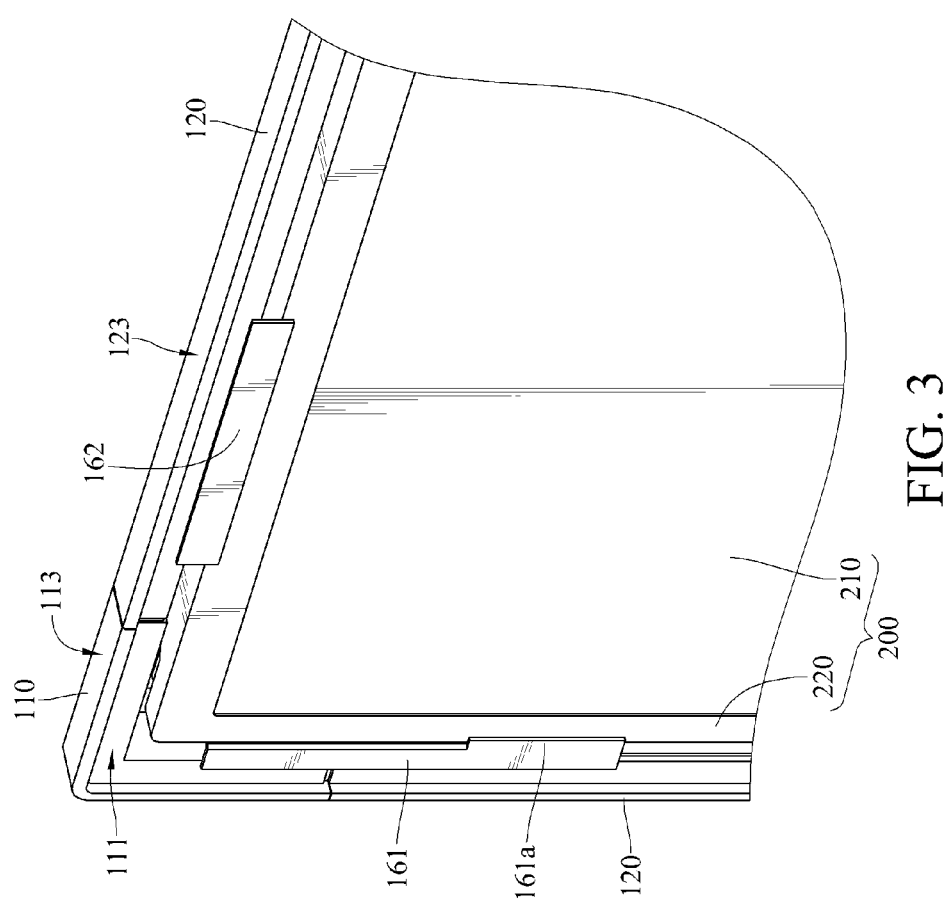
FIG. 3 is a partially perspective view of the display device in FIG. 2 when a display module is assembled with a display frame.

Please refer to FIG. 1A through FIG. 3. FIG. 1A is a rear perspective view of a display device according to a first embodiment of the disclosure. FIG. 1B is a rear view of the display device in FIG. 1A. FIG. 2 is a partially exploded view of the display device in FIG. 1A. FIG. 3 is a partially perspective view of the display device in FIG. 2 when a display module is assembled with a display frame. In this embodiment, the display device 10 includes a display frame 100, a display module 200 and a light transmissive layer 300.

Figure 4:
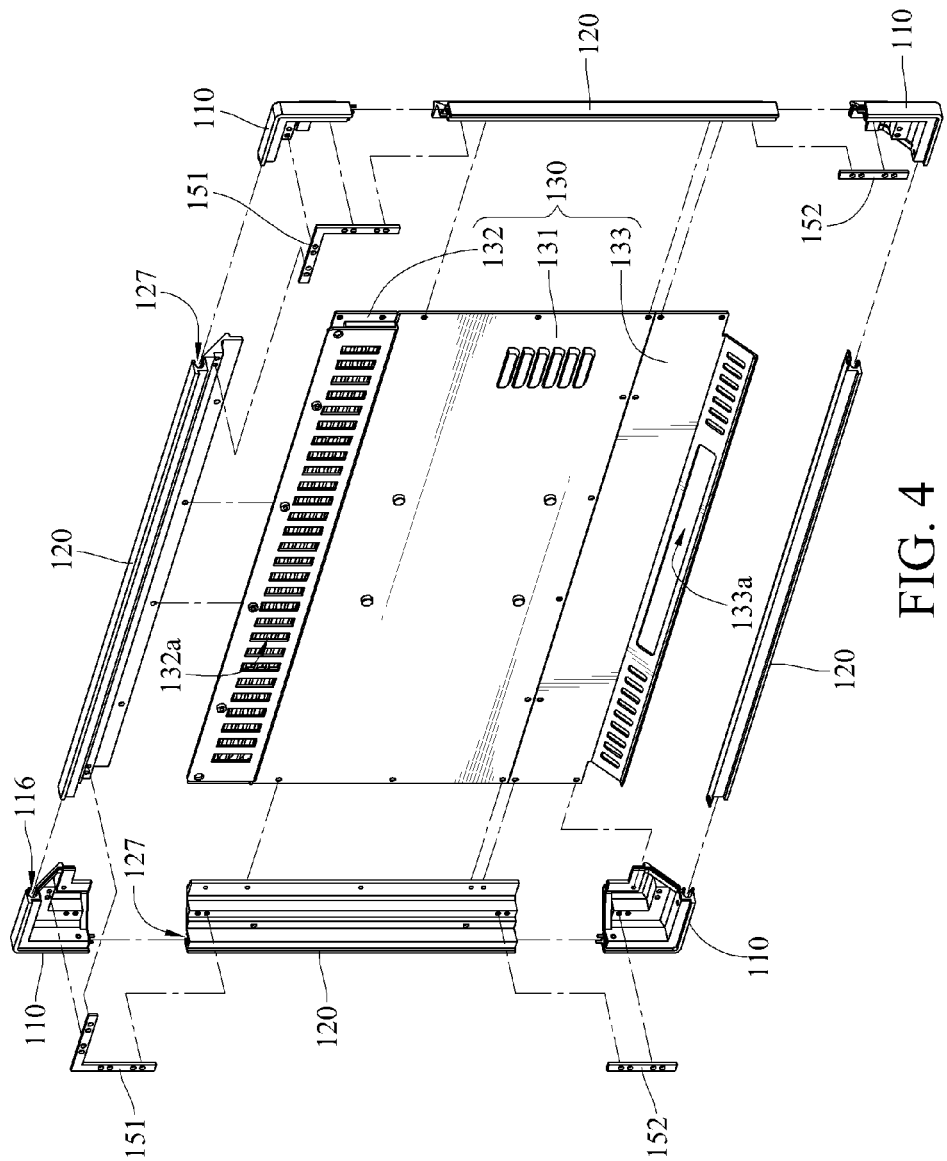
FIG. 4 and FIG. 5 are partially exploded views of the display frame in FIG. 2.
Figure 5:
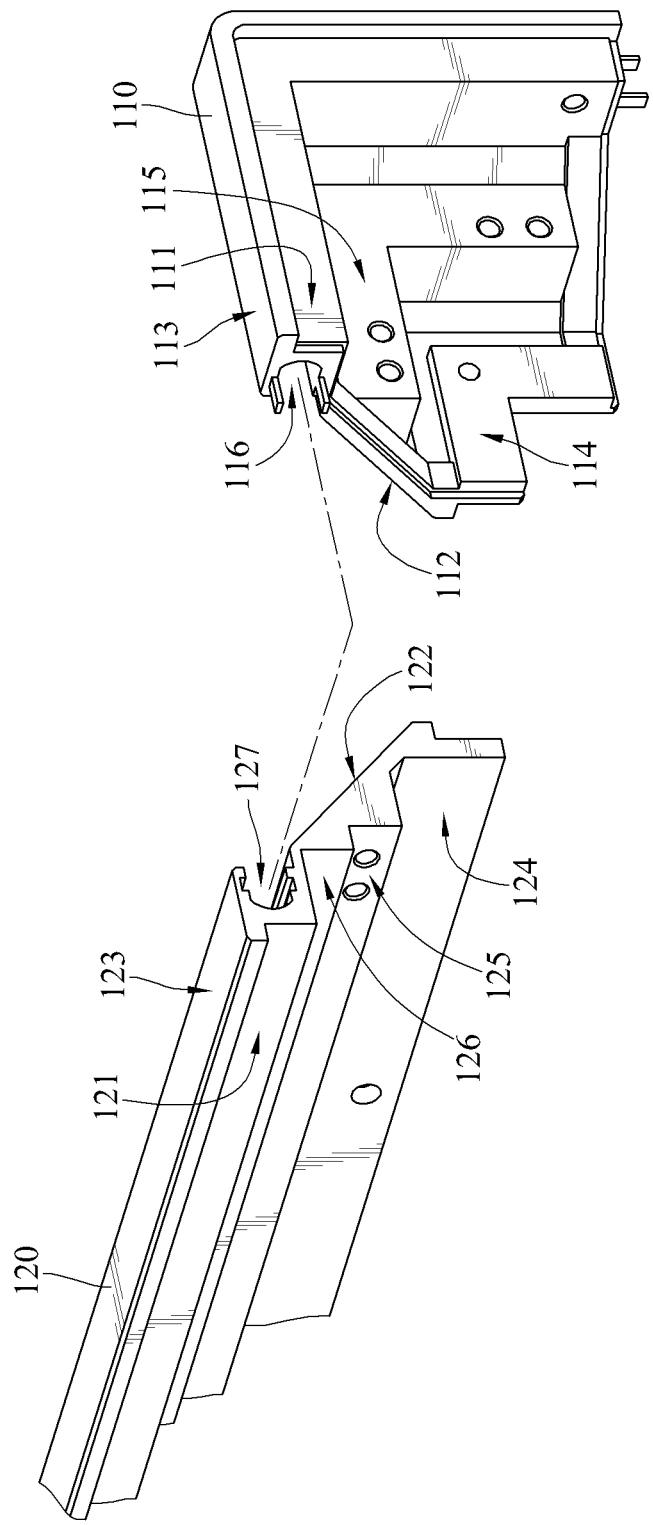
Figure 6:
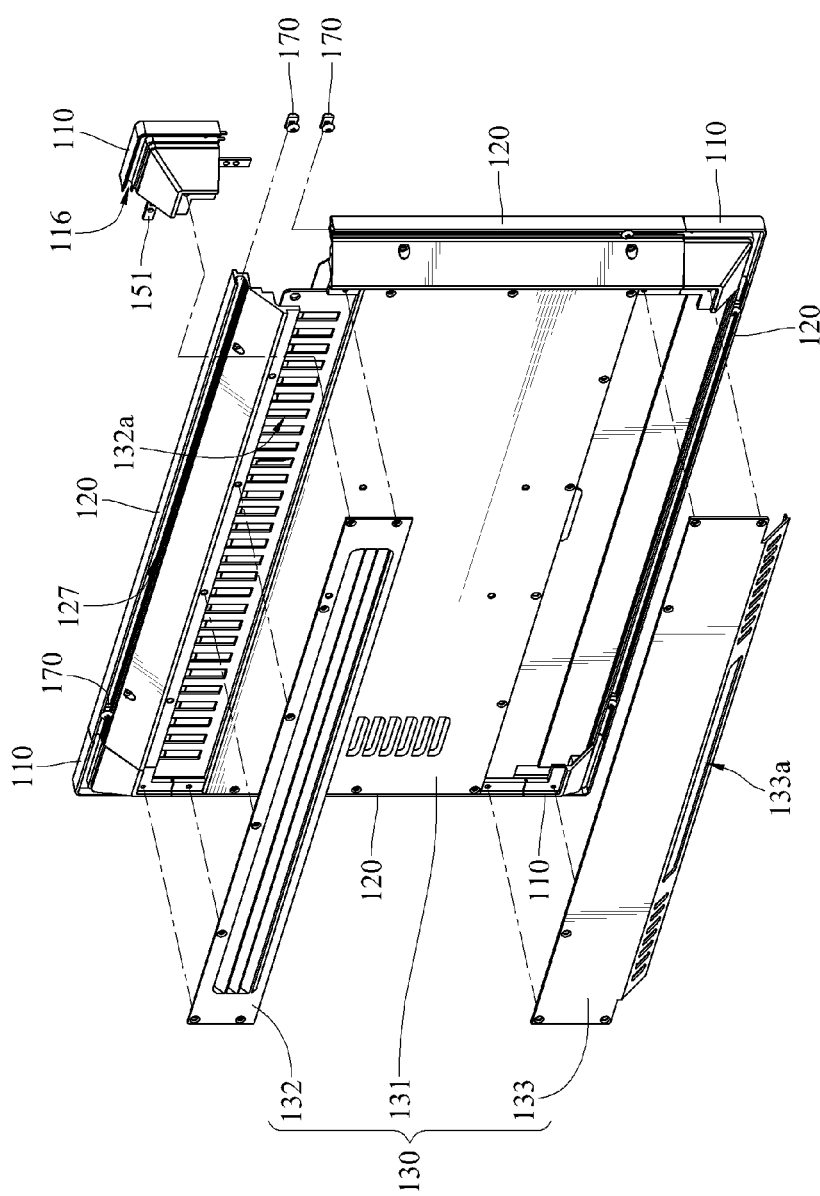
FIG. 6 is an exploded view of the back cover in FIG. 2.

Please refer to FIG. 4 through FIG. 6. FIG. 4 and FIG. 5 are partially exploded views of the display frame in FIG. 2. FIG. 6 is an exploded view of the back cover in FIG. 2. The display frame 100 includes a plurality of corner frame pieces 110, a plurality of side frame pieces 120, a back cover 130, two first fixed support strips 151, two second fixed support strips 152, a bearing plate 140, a plurality of assembly support strips 161, two limiting plates 162 and a slidable assembly block 170.

Each corner frame piece 110 is an L-shaped frame piece, for being connected to the two side frame pieces 120. Additionally, each corner frame piece 110 has a front surface 111, a rear surface 112, a side surface 113, a first assembly surface 114 and a second assembly surface 115. The rear surface 112 is opposite to the front surface 111. The side surface 113 is connected to and located between the front surface 111 and the rear surface 112. The first assembly surface 114, the second assembly surface 115 and the front surface 111 face toward the back cover 130. The second assembly surface 115 is closer to the front surface 111 than the first assembly surface 114.

The corner frame pieces 110 are connected to the side frame pieces 120, for forming an accommodating space 105 surrounded by the corner frame pieces 110 and the side frame pieces 120. Specifically, each side frame piece 120 is in the form of an analuminum extrusion. The accommodating space 105 is formed by sequentially connecting the corner frame piece 110, the side frame piece 120, the corner frame piece 110, the side frame piece 120 and so on. However, in other embodiments, for example, the accommodating space 105 is formed by sequentially connecting the corner frame piece 110, the side frame piece 120, the side frame piece 120, the corner frame piece 110, the side frame piece 120, the side frame piece 120 and so on.

Each of the side frame pieces 120 located at a top side, a left side and a right side of the display frame 100 has a front surface 121, a rear surface 122, a side surface 123, a first assembly surface 124, a second assembly surface 125 and a third assembly surface 126. The rear surface 122 is opposite to the front surface 121. The side surface 123 is connected to and located between the front surface 121 and the rear surface 122. The first assembly surface 124, the second assembly surface 125, the third assembly surface 126 and the front surface 121 face toward the back cover 130. The second assembly surface 125 is closer to the front surface 121 than the first assembly surface 124, and the third assembly surface 126 is closer to the front surface 121 than the second assembly surface 125.

The back cover 130 includes a first back cover 131, a second back cover 132 and a third back cover 133. The first back cover 131, the second back cover 132 and the third back cover 133 are assembled with the corner frame pieces 110 and the side frame pieces 120. The first back cover 131 has two sides which are opposite to each other, and the third back cover 133 and the second back cover 132 are located at the two sides of the first back cover 131, respectively. Specifically, the first back cover 131 covers a part of the accommodating space 105 and is assembled with the first assembly surface 114 of the corner frame pieces 110 and the first assembly surface 124 of the side frame pieces 120 by screws. The second back cover 132 has a plurality of vents 132a and is assembled with the corner frame pieces 110 and the side frame pieces 120 which are located at a top side of the display frame 100. The third back cover 133 has a through hole 133a and is assembled with the corner frame pieces 110 and the side frame pieces 120 which are located at a bottom side of the display frame 100

The two first fixed support strips 151 are combined with the second assembly surfaces 115 of the side frame pieces 120 and the second assembly surfaces 125 of the corner frame pieces 110 at two corners of the display frame 100, respectively. The two second fixed support strip 152 are combined with the second assembly surfaces 115 of the side frame pieces 120 and the second assembly surfaces 125 of the corner frame pieces 110 at other two corners of the display frame 100, respectively. Specifically, each first fixed support strip 151 is a L-shaped strip and assembled with the second assembly surface 115 of one of the corner frame pieces 110 and the second assembly surfaces 125 of two of the side frame pieces 120 by screws, for enhancing the structural strength of the display frame 100. Each second fixed support strip 152 is a straight strip and assembled with the second assembly surface 115 of one of the corner frame pieces 110 and the second assembly surfaces 125 of two of the side frame pieces 120 by screws, for enhancing the structural strength of the display frame 100. Without the second fixed support strip 152, for example, the corner frame pieces 110 is directly assembled with the side frame pieces 120 by screws. In this embodiment, both the quantities of the first fixed support strips 151 and the second fixed support strips 152 are two. However, in other embodiments, for example, both the quantities of the first fixed support strips 151 and the second fixed support strips 152 are four in order to enhance the structural strength of the display frame 100.

Please refer to FIG. 2 and FIG. 3 again, the bearing plate 140 has two sides which are opposite to each other, and the two sides of the bearing plate 140 are assembled with two side frame pieces 120 which are located at two sides of the display frame 100. The assembly support strips 161 are sorted into two groups. The two groups of the assembly support strips 161 are assembled with the third assembly surfaces 126 of the two side frame pieces 120 which are located at two sides of the display frame 100 and opposite to each other, respectively.

The display module 200 includes a display panel 210 and a fixed bezel 220. The fixed bezel 220 is surrounded by and fixed to the display panel 210. The fixed bezel 220 has two sides which are opposite to each other, and the two third assembly surfaces 126 of the two assembly support strips 161 are fixed to the two sides of the fixed bezel 220, such that the display module 200 is disposed inside the accommodating space 105. Moreover, the bearing plate 140 disposed inside the accommodating space 105 is for supporting the display module 200, such that the display module 200 is fixed to the display frame 100 steadily.

Furthermore, each assembly support strip 161 further has a limited protrusion 161a, for being pressed against a side of the fixed bezel 220 which is away from the bearing plate 140. Accordingly, the fixed bezel 220 of the display module 200 is interposed between the limited protrusion 161a and the bearing plate 140.

The limiting plate 162 is combined with the third assembly surface 126 of the side frame piece 120 which is located between the two assembly support strips 161, for being pressed against a side of the fixed bezel 220 where is away from the display frame 100. Accordingly, the display module 200 is fixed to the display frame 100 steadily.

The slidable assembly block 170 is slidably disposed inside sliding grooves 116 formed on the corner frame pieces 110 and the side frame pieces 120. The slidable assembly block 170, for example, has a screw, for being assembled with external expansion device 30.

Additionally, as shown in FIG. 6, in this embodiment, only if one of the corner frame pieces 110 is removed, the slidable assembly block 170 is able to be pulled out from or put into the sliding groove 116.

The light transmissive layer 300, for example, is made of glass. The light transmissive layer 300 is disposed on the front surfaces 111 of the corner frame pieces 110 and the front surfaces 121 of the side frame piece 120, for accommodating the display module 200 inside the accommodating space 105 and preventing dust from entering the accommodating space 105.

In this embodiment, the display frame 100 is not a one-piece frame, which means the display frame 100 is formed by the corner frame pieces 110 and the side frame pieces 120. That is, when the size of the display device 10 is changed, the manufacturer is able to cut the side frame pieces 120 according to a predetermined length, and assemble the side frame pieces 120 with the corner frame pieces 110 to form the display frame which matching with the size of the display module 200. Namely, when the size of display module 200 is 17 inches, the manufacturer cuts the side frame pieces 120 according to a predetermined length of the 17-inch display module, and then assemble the side frame pieces 120 with the corner frame pieces 110 to form the display frame 100 which matching with the size of the 17-inch display module. Thus, the manufacturer does not need to replace the display panel 210 and prepare a new mold for the display frame 100 when the size of the display device 10 is changed. The manufacture is able to cut the side frame pieces 120 according to the predetermined length of a display module and assemble the side frame pieces 120 with the corner frame pieces 110 to form the display frame which matching with the size of the display module 200.

Figure 7:
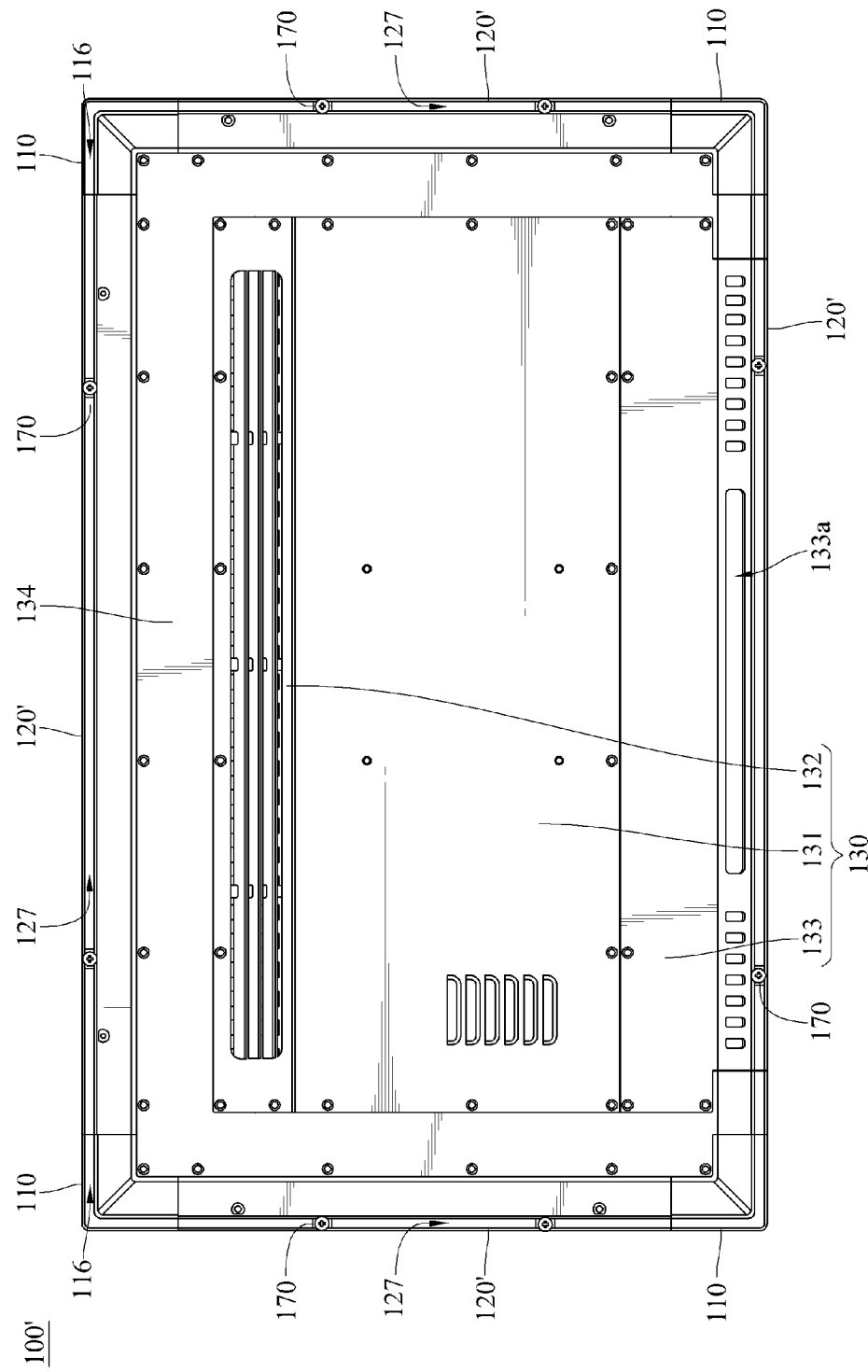
FIG. 7 is a rear view of a display device according to a second embodiment of the disclosure from a back viewpoint.

Specifically, please refer to FIG. 7, which is a rear view of a display device according to a second embodiment of the disclosure from a back viewpoint. In this embodiment, a length of each side frame piece 120' is greater than a length of each side frame piece 120 in FIG. 1. Accordingly, a size of a display frame 100' formed by each side frame piece 120' and each corner frame pieces 110 is greater than a size of the display frame 100 in the first embodiment. However, a size of the back cover 130 does not meet the size of the display frame 100'. Thus, the back cover 130 further includes a connecting cover 134, for being assembled with the each corner frame pieces 110 and each side frame piece 120'. Moreover, the first back cover 131, the second back cover 132 and the third back cover 133 is assembled with the connecting cover 134. Hence, the back cover 130 is able to meet the size of the display frame 100' due to the disposition of the connecting cover 134.

Figure 8:
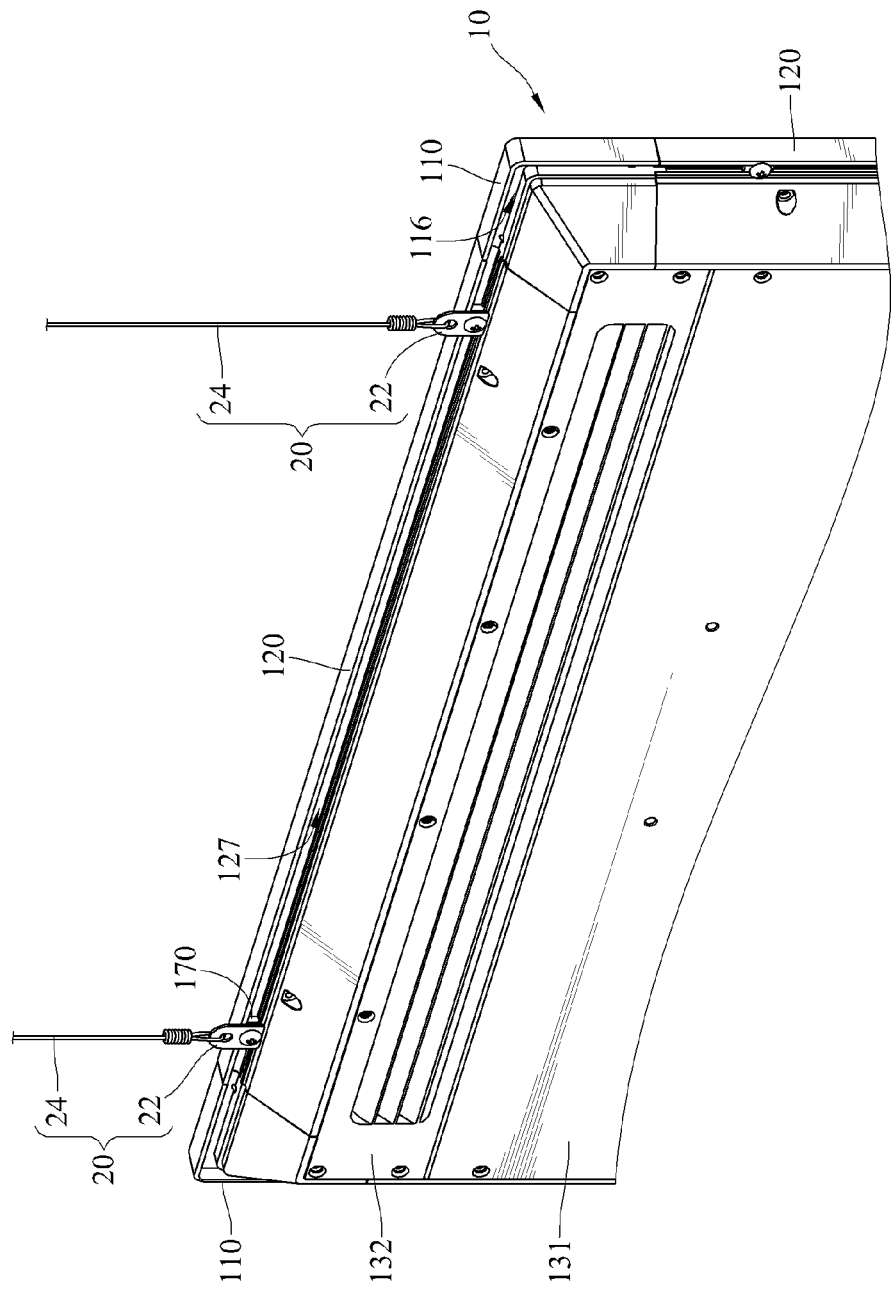
FIG. 8 is a partially perspective view of the display device in FIG. 1 when the display device is suspended.

Please refer to FIG. 8, which is a partially perspective view of the display device in FIG. 1 when the display device is suspended. In this embodiment, the display device 10 is suspended on a wall or a ceiling via a connection of the slidable assembly block 170 and a suspension component 20. Specifically, the suspension component 20 includes two assembly pieces 22 and two wires 32. The two assembly piece 22 are combined with the two slidable assembly block 170 which are located at the top side of the two slidable assembly blocks 170. An end of each wire 32 is combined with each assembly piece 22, and the other end of each wire 32 is hung on the wall or the ceiling. The two slidable assembly blocks 170 are moved to predetermined positions. Finally, as shown in FIG. 8, the display device 10 is suspended. As above mentioned, the positions of the slidable assembly blocks 170 is able to be adjusted and the slidable assembly blocks 170 is provided for allowing the display device 10 to be suspended on the wall without drilling a hole through the display device 10.

Figure 9:
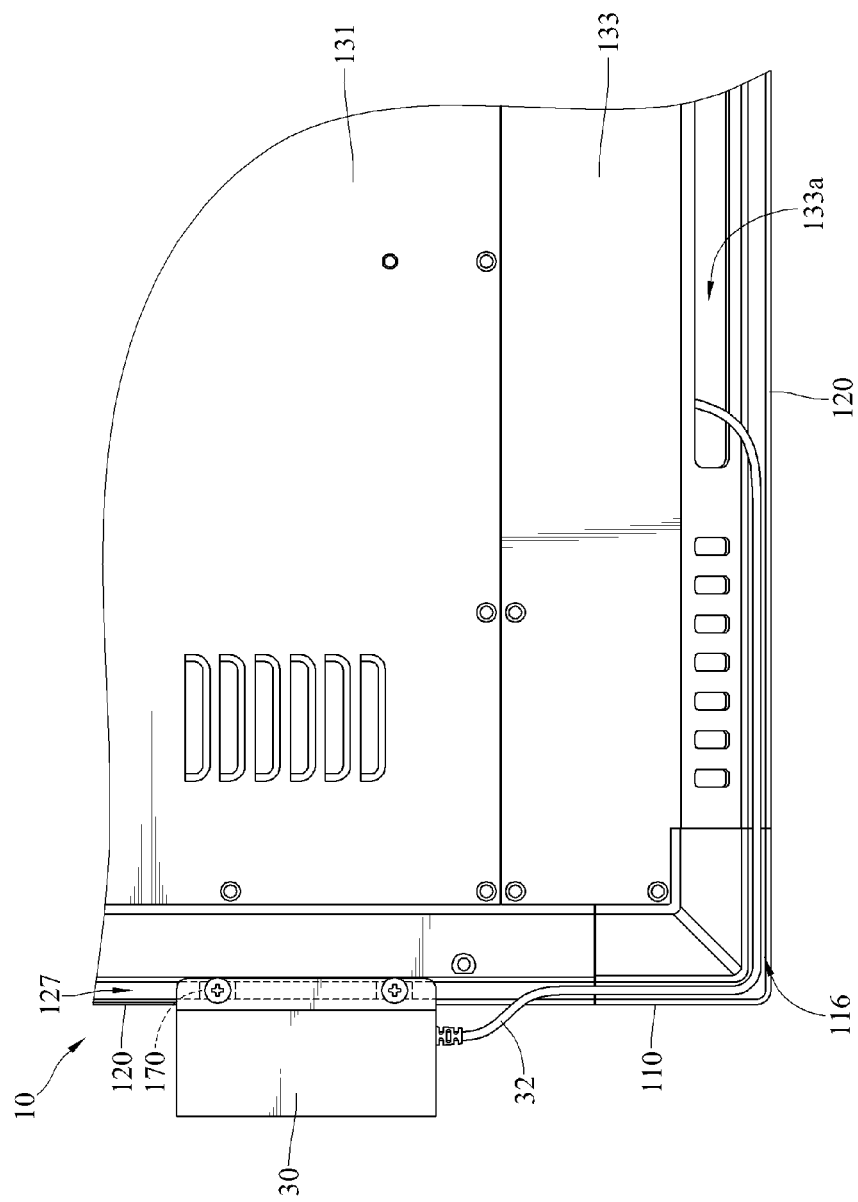
FIG. 9 is a partially perspective view of the display device in FIG. 1 which is assembled with an external expansion device.

Please refer to FIG. 9, which is a partially perspective view of the display device in FIG. 1 which is assembled with an external expansion device. In this embodiment, an external expansion device 30 is assembled with the display device 10 by the slidable assembly blocks 170. The external expansion device 30, for example, is a dynamic sensing device, a photographic apparatus or a card reader. Additionally, the sliding groove 116 is able to be utilized for cable management. In other words, the wire 32 connected to the external expansion device 30 is disposed inside the sliding grooves 116 of the corner frame pieces 110 and the sliding grooves 127 of the side frame piece 120, for enhancing the aesthetic appearance of the display device 10.

Figure 10:
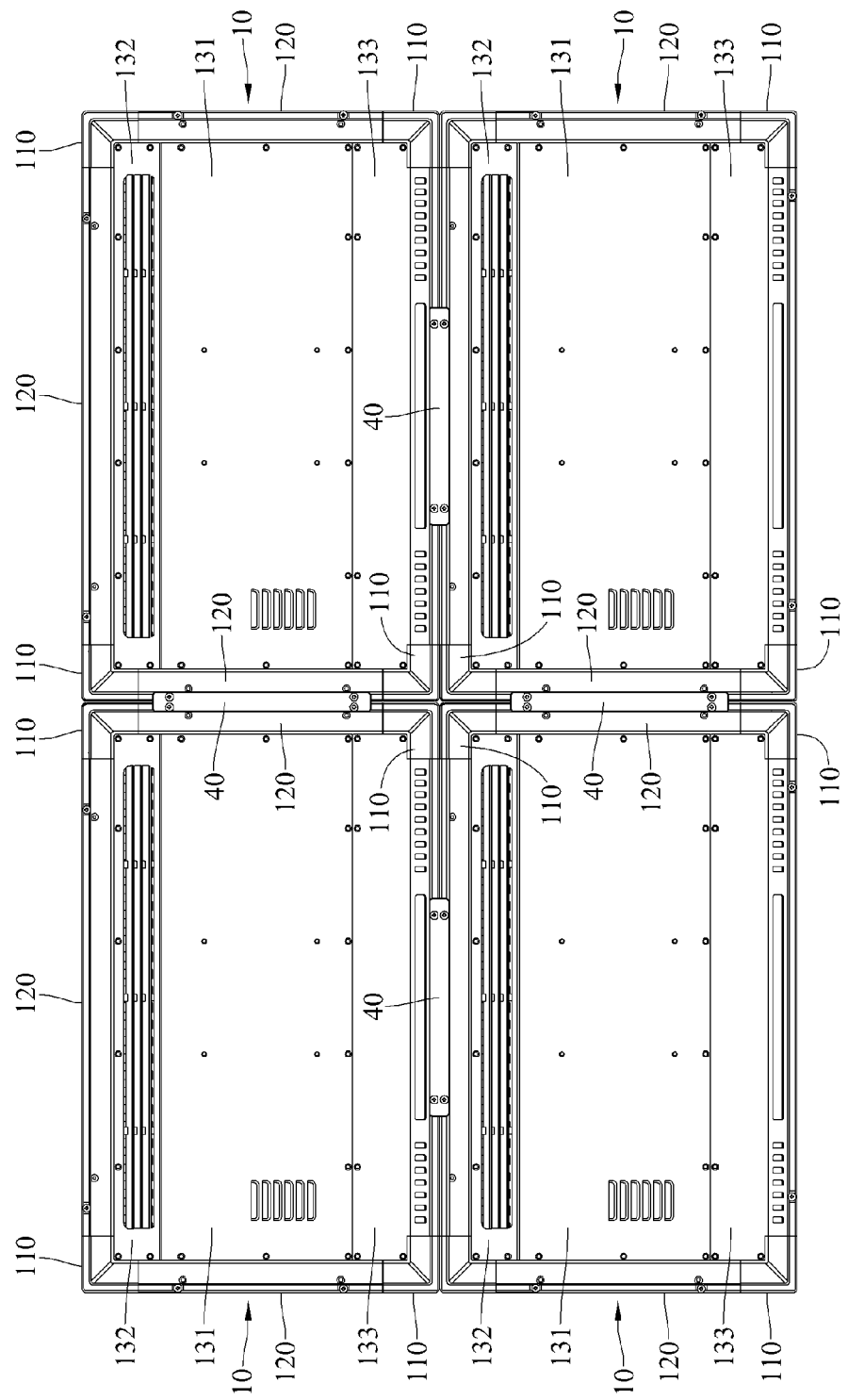
FIG. 10 is a rear view of the plurality of display devices in FIG. 1 which are connected to one another via a connecting plate.
Figure 11:
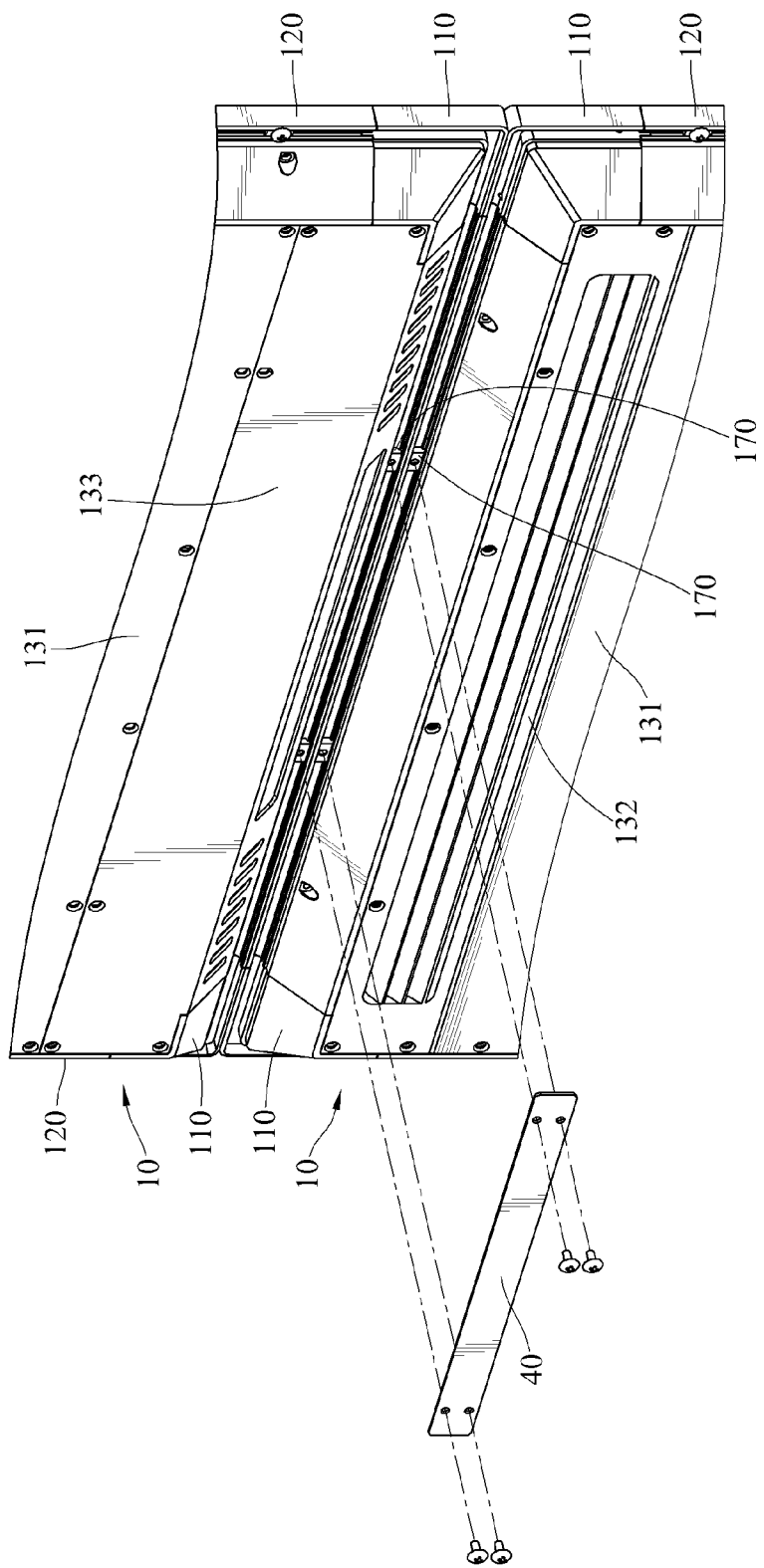
FIG. 11 is a partially exploded view of the display devices in FIG. 10A.

Please refer to FIG. 10 and FIG. 11. FIG. 10 is a rear view of the plurality of display devices in FIG. 1 which are connected to one another via a connecting plate. FIG. 11 is a partially exploded view of the display devices in FIG. 10A. In this embodiment, each display device 10 is assembled with the slidable assembly blocks 170 of other display devices 10 by a plurality of connecting plates 40, such that the display devices 10 are arranged in an array to form a display wall.

Figure 12:
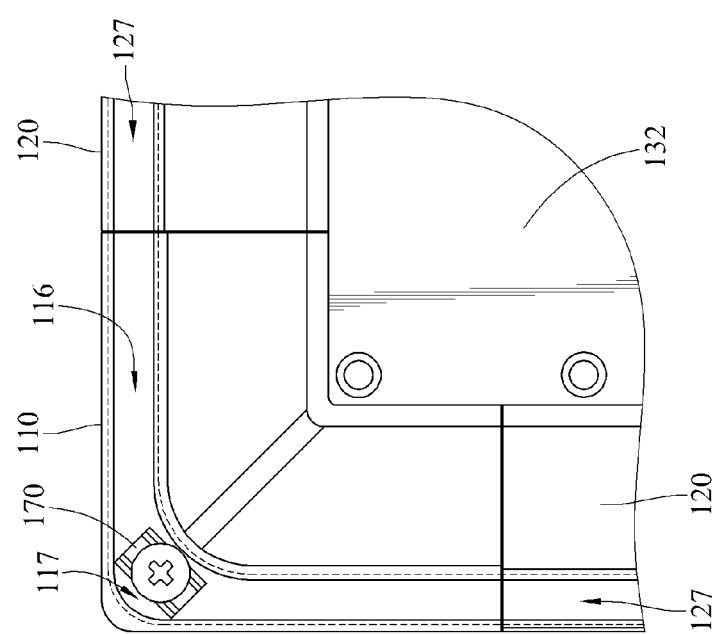
FIG. 12 is a partially rear view of a display device according to a third embodiment of the disclosure.

Please refer to FIG. 12, which is a partially rear view of a display device according to a third embodiment of the disclosure. A width of the sliding groove 116 at the corner of the display device 10 is widened for forming an assembly space 117. Thus, the slidable assembly block 170 is able to be removed from the sliding groove 116 or disposed inside the sliding groove 116 via the assembly space 117 without detaching the display frame 100. Thus, the slidable assembly block 170 and the sliding groove 116 are able to be attached to or detached from each other efficiently.

Figure 13:
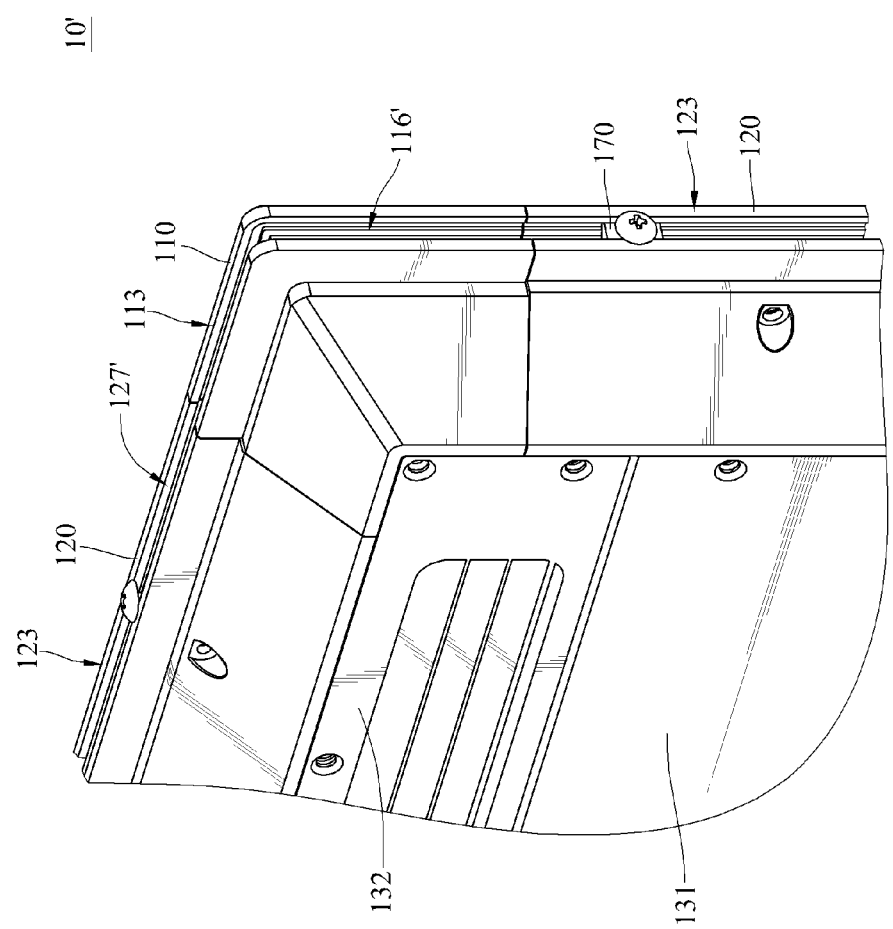
FIG. 13 is a partially rear perspective view of a display device according to a fourth embodiment of the disclosure.

Please refer to FIG. 13, which is a partially rear perspective view of a display device according to a fourth embodiment of the disclosure. In the first embodiment shown in FIG. 5, the sliding grooves 116 are formed on the rear surfaces 112 of the corner frame pieces 110 and the side frame pieces 120. However, in other embodiments, as shown in FIG. 13, the sliding grooves 116' of the display device 10' are formed on the side surfaces 113 of the corner frame pieces 110 and the side frame pieces 120.

Figure 14:
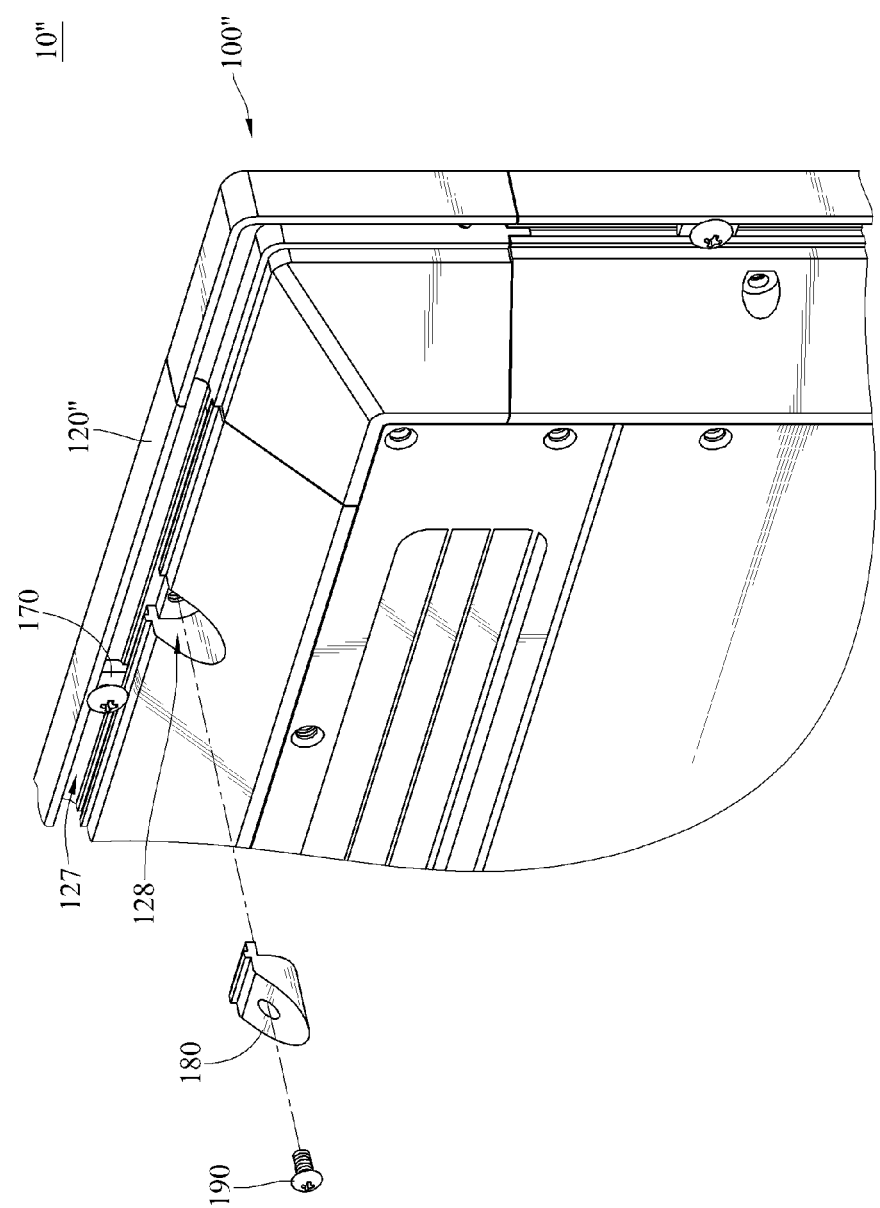
FIG. 14 is a partially rear perspective view of a display device according to a fifth embodiment of the disclosure.

Please refer to FIG. 14, which is a partially rear perspective view of a display device according to a fifth embodiment of the disclosure. Since this embodiment is similar to the first embodiment in FIG. 1, only the difference between this embodiment and the first embodiment will be described as follows.

In this embodiment, at least one side frame piece 120" further has a fastening slot 128 communicating with the sliding groove 127. Accordingly, the slidable assembly block 170 is disposed inside the sliding groove 127 from the fastening slot 128. Furthermore, the display frame 100" further includes a fastening block 180 and a fixing component 190. The fastening block 180 is detachably disposed inside the fastening slot 128. The fixing component 190 is fixed to the side frame piece 120" by penetrating through the fastening block 180.

The assembly process of the slidable assembly block 170 will be described as follows. Please refer to FIG. 15 through FIG. 17, which are partially rear perspective views of the display device in FIG. 14 when a slidable assembly block is slidably disposed inside a sliding groove.

Figure 15:
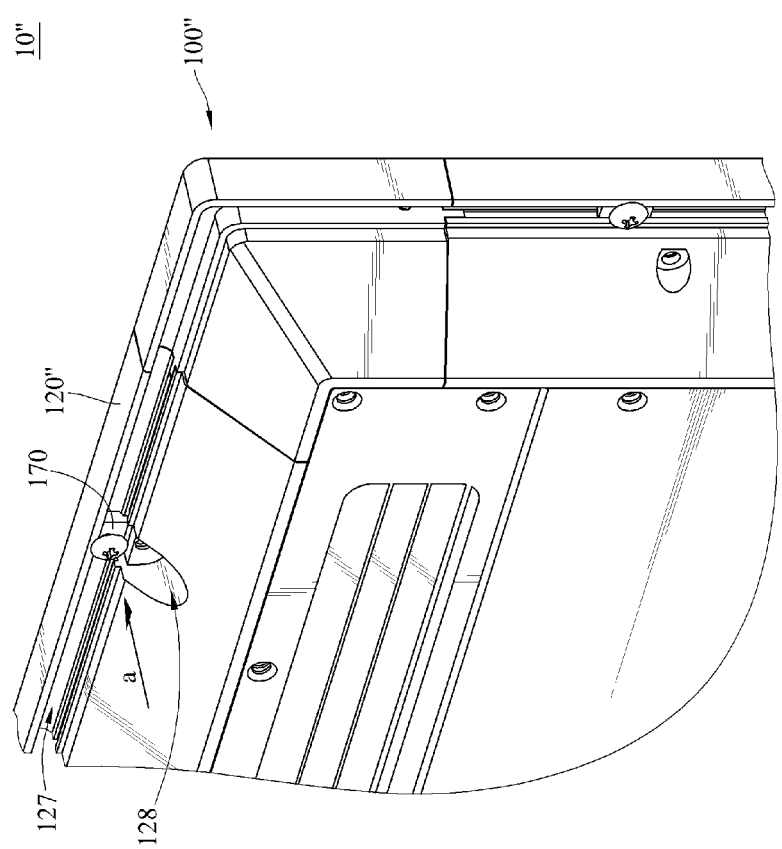
FIG. 15 through FIG. 17 are partially rear perspective views of the display device in FIG. 14 when a slidable assembly block is slidably disposed inside a sliding groove.

As shown in FIG. 15, first, the fastening block 180 is removed and the fastening slot 128 exposes to the outside of the display device 10. Then, the slidable assembly block 170 is disposed inside the sliding groove 127 along a direction indicated by an arrow a from the fastening slot 128.

Figure 16:
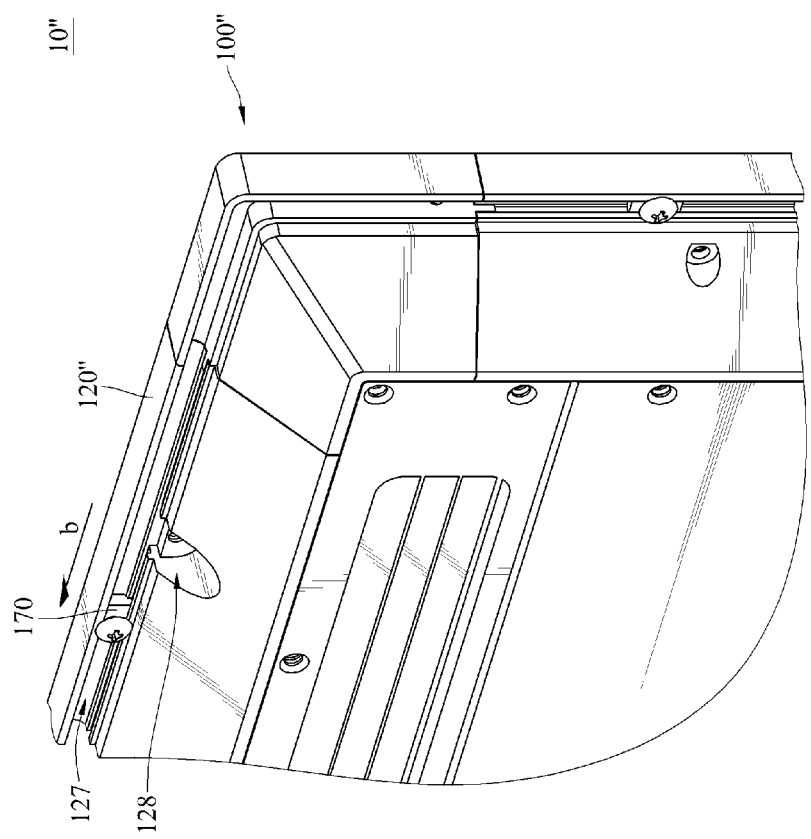

Then, as shown in FIG. 16, the slidable assembly block 170 is moved away from the fastening slot 128 along a direction indicated by an arrow b. This prevents the slidable assembly block 170 from being separated from the sliding groove 127 via the fastening slot 128.

Figure 17:
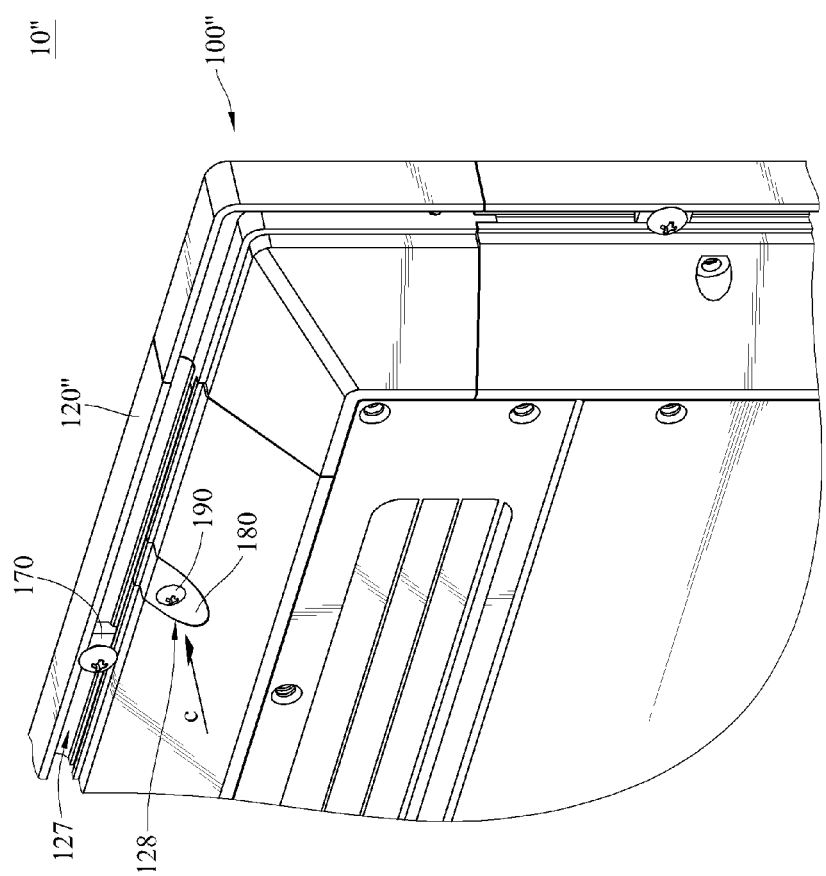

Then, as shown in FIG. 17, the fastening block 180 is put into the fastening slot 128 along a direction indicated by an arrow c, for preventing the slidable assembly block 170 from being separated from the sliding groove 127 via the fastening slot 128. Then, the fixing component 190 is fixed to the side frame piece 120" by penetrating through the fastening block 180.

According to the assembly process of the slidable assembly block 170, the fastening slot 128 is able to be utilized for simplifying the assembly process of the slidable assembly block 170. Compared with the first embodiment in FIG. 6, in this embodiment, the corner frame pieces 110 do not need to be removed when assembling the slidable assembly block 170.

According to the display frame and the display device of this disclosure, since the corner frame pieces and the side frame pieces are modularized for forming the display frame, the side frame pieces with different predetermined lengths is able to be assembled with the corner frame pieces for forming the display frames with different sizes. Thus, the manufacturer does not need to prepare a new mold for the display frames with different sizes when the sizes of the front frames and the rear frames are changed. It saves time and cost in manufacturing the display frames.

Additionally, due to the disposition of the slidable assembly block, external expansion devices are able to be assembled with the display device. Furthermore, since the slidable assembly block is slidable, the position of the external expansion device can be adjusted, for improving the assembly efficiency of the external expansion device and the display device.

The disclosure will become more fully understood from the said embodiment for illustration only and thus does not limit the disclosure. Any modifications within the spirit and category of the disclosure fall in the scope of the disclosure.

What is claimed is:

1. A display device, comprising:
a display frame comprising:
a plurality of side frame pieces, each side frame piece having a predetermined length;
a plurality of corner frame pieces connected to the plurality of side frame pieces, for forming an accommodating space surrounded by the plurality of side frame pieces and the plurality of corner frame pieces;
two first fixed support strips;
two second fixed support strips;
a back cover assembled with a side of the plurality of side frame pieces and a side of the plurality of corner frame pieces, and covering the accommodating space; and
a display module disposed inside the accommodating space of the display frame,
wherein, each of the plurality of corner frame pieces and the plurality of side frame pieces further has a front surface, a first assembly surface and a second assembly surface, the plurality of front surfaces, the plurality of first assembly surfaces and the plurality of second assembly surfaces face toward the back cover, the plurality of second assembly surfaces being closer to the front surface than the plurality of first assembly surfaces, the back cover is assembled with the plurality of first assembly surfaces, the two first fixed support strips being combined with the plurality of side frame pieces and the plurality of corner frame pieces at two corners of the display frame, respectively, and the two second fixed support strips being combined with the plurality of side frame pieces and the plurality of corner frame pieces at other two corners of the display frame, respectively.

2. The display device according to claim 1, further comprising at least two assembly support strips, the display module further comprising a display panel and a fixed bezel, the display panel being fixed to and surrounded by the fixed bezel, each side frame piece further having a third assembly surface, the plurality of third assembly surfaces being closer to the front surface than the plurality of second assembly surfaces, the fixed bezel having two sides which are opposite to each other, and the two assembly support strips being combined with the two sides of the fixed bezel and fixed to the two third assembly surfaces of the two side frame pieces and, respectively.

3. The display device according to claim 2, wherein each assembly support strip has a limited protrusion for being pressed against a side of the fixed bezel which is away from the display frame.

4. The display device according to claim 2, further comprising a limiting plate, the limiting plate being combined with the third assembly surface of the side frame piece which is located between the two assembly support strips for being pressed against a side of the fixed bezel where is away from the display frame.

5. The display device according to claim 1, further comprising a slidable assembly block, each of the corner frame pieces having a first sliding groove and a first rear surface, the side frame pieces having a second sliding groove and a second rear surface, the first and the second rear surfaces being opposite to the front surface, the first sliding groove being formed on the first rear surface, the second sliding groove being formed on the second rear surface, and the slidable assembly block being slidably disposed inside the first or the second sliding groove.

6. The display device according to claim 5, wherein one of the plurality of side frame pieces has a fastening slot communicating with the second sliding groove, the display frame further comprises a fastening block and a fixing component, the fastening block is detachably disposed inside the fastening slot, and the fixing component is fixed to the side frame piece by penetrating through the fastening block.

7. The display device according to claim 1, further comprising a slidable assembly block, each of the corner frame pieces having a first rear surface, a first side surface and a first sliding groove, the side frame pieces having a second rear surface, a second side surface and a second sliding groove, the first and the second rear surfaces facing oppositely to the front surface, the first side surface being located between the front surface and the first rear surface, the second side surface being located between the front surface and the second rear surface, the first sliding groove being formed on the first side surface, the second sliding groove being formed on the second side surface, and the slidable assembly block being slidably disposed inside the first or the second sliding groove.

8. The display device according to claim 1, further comprising a light transmissive layer stacked on the front surface, such that the display module is maintained inside the accommodating space.

9. The display device according to claim 1, further comprising a bearing plate with two sides which are opposite to each other, the display frame having two sides which are opposite to each other, the two sides of the bearing plate being assembled with the two side frame pieces located at the two sides of the display frame, respectively, and the bearing plate being for supporting the display module.

10. The display device according to claim 1, wherein the back cover further comprises a first back cover, a second back cover and a third back cover all of which are assembled with the plurality of corner frame pieces and the plurality of side frame pieces, the first back cover has two sides which are opposite to each other, the second back cover and the third back cover are located at the two sides of the first back cover, respectively, the second back cover has a plurality of vents, and the third back cover has a through hole.

11. A display frame, comprising:
a plurality of side frame pieces, each side frame piece having a predetermined length;
a plurality of corner frame pieces connected to the plurality of side frame pieces, for forming an accommodating space surrounded by the plurality of side frame pieces and the plurality of corner frame pieces;
two first fixed support display frames;
two second fixed support strips; and
a back cover assembled with a side of the plurality of side frame pieces and a side of the plurality of corner frame pieces, and covering the accommodating space,
wherein, each of the plurality of corner frame pieces and the plurality of side frame pieces further has a front surface, a first assembly surface and a second assembly surface, the plurality of front surfaces, the plurality of first assembly surfaces and the plurality of second assembly surfaces face toward the back cover, the plurality of second assembly surfaces being closer to the front surface than the plurality of first assembly surfaces, the back cover is assembled with the plurality of first assembly surfaces, the two first fixed support strips being combined with the plurality of second assembly surfaces of the plurality of side frame pieces and the plurality of second assembly surfaces of the plurality of corner frame pieces at two corners of the display frame respectively, and the two second fixed support strips being combined with the plurality of second assembly surfaces of the plurality of side frame pieces and the plurality of second assembly surfaces of the plurality of corner frame pieces at other two corners of the display frame, respectively.

12. The display frame according to claim 11, further comprising at least two assembly support strips, each side frame piece further having a third assembly surface, the plurality of third assembly surfaces being closer to the front surface than the plurality of second assembly surfaces, the two assembly support strips being combined with the two third assembly surfaces of the two side frame pieces which are opposite to each other, and the two assembly support strips being combined with two sides of a display module which are opposite to each other.

13. The display frame according to claim 12, wherein each assembly support strip has a limited protrusion for being pressed against a side of the display module where is far away from the display frame.

14. The display frame according to claim 12, further comprising a limiting plate, the limiting plate being combined with the side frame piece and the third assembly surface which are located between the two assembly support strips and for being pressed against a side of the display module where is far away from the display frame.

15. The display frame according to claim 11, further comprising a slidable assembly block, each of the corner frame pieces having a first sliding groove and a first rear surface, the side frame pieces having a second sliding groove and a second rear surface, the first and the second rear surfaces being opposite to the front surface, the first sliding groove being formed on the first rear surface, the second sliding groove being formed on the second rear surface, and the slidable assembly block being slidably disposed inside the first or the second sliding groove.

16. The display frame according to claim 15, wherein one of the plurality of side frame pieces has a fastening slot communicating with the second sliding groove, the display frame further comprises a fastening block and a fixing component, the fastening block is detachably disposed inside the fastening slot, and the fixing component is fixed to the side frame piece by penetrating through the fastening block.

17. The display frame according to claim 11, further comprising a slidable assembly block, each of the corner frame pieces having a first rear surface, a first side surface and a first sliding groove, the side frame pieces having a second rear surface, a second side surface and a second sliding groove, the first and the second rear surfaces facing oppositely to the front surface, the first side surface being located between the front surface and the first rear surface, the second side surface being located between the front surface and the second rear surface, the first sliding groove being formed on the first side surface, the second sliding groove being formed on the second side surface, and the slidable assembly block being slidably disposed inside the first or the second sliding groove.

18. The display frame according to claim 11, further comprising a bearing plate with two sides which are opposite to each other, the display frame having two sides which are opposite to each other, the two sides of the bearing plate being assembled with the two side frame pieces located at the two sides of the display frame respectively, and the bearing plate being for supporting the display module.

19. The display frame according to claim 11, wherein back cover further comprises a first back cover, a second back cover and a third back cover all of which are assembled with the plurality of corner frame pieces and the plurality of side frame pieces, the first back cover has two sides which are opposite to each other, the second back cover and the third back cover are located at the two sides of the first back cover respectively, the second back cover has a plurality of vents, and the third back cover has a through hole.

* * * * *